United States Patent [19]

Summers

[11] E Re. 29,625

[45] Reissued May 9, 1978

[54] PROCESS AND APPARATUS FOR SEPARATING SAND FROM BOTANICAL MATERIALS

[75] Inventor: Thomas Wade Summers, Fern Creek, Ky.

[73] Assignee: Brown & Williamson Tobacco Corporation, Louisville, Ky.

[21] Appl. No.: 716,392

[22] Filed: Aug. 23, 1976

Related U.S. Patent Documents

Reissue of:

[64] Patent No.: 3,842,978
Issued: Oct. 22, 1974
Appl. No.: 236,693
Filed: Mar. 21, 1972

[51] Int. Cl.[2] ..... B03B 4/08

[52] U.S. Cl. ..... 209/469; 209/139 R; 209/467; 209/486

[58] Field of Search ..... 209/17, 28, 29, 36, 209/37, 44, 138, 139 R, 158, 424, 426, 467, 469, 474, 476, 454, 456, 154, 475, 502

[56] References Cited

U.S. PATENT DOCUMENTS

| | | | |
|---|---|---|---|
| 2,068,783 | 1/1937 | Wendell | 209/44 |
| 2,678,131 | 5/1954 | Dore | 209/486 X |
| 2,683,685 | 7/1954 | Matheson | 209/139 R X |
| 2,857,050 | 10/1958 | Nebel | 209/159 |
| 3,164,548 | 1/1965 | Rowell et al. | 209/139 R |
| 3,279,597 | 10/1966 | Reinhall | 209/161 X |
| 3,406,824 | 10/1968 | Forsberg | 209/467 |
| 3,596,765 | 8/1971 | Beudin | 209/486 X |
| 3,610,415 | 10/1971 | Deak | 209/466 |
| 3,627,129 | 12/1971 | Hartmann et al. | 209/474 |

*Primary Examiner*—Frank W. Lutter
*Assistant Examiner*—Ralph J. Hill
*Attorney, Agent, or Firm*—William J. Mason

[57] ABSTRACT

Apparatus is provided for the separation of sand and botanical materials, particularly tobacco, the apparatus including a fluidized bed and a porous support for the mixture of sand and botanical materials. The method incorporates the apparatus and aids in the separation, the method potentially including a pulsed fluid flow superimposed on a steady fluid flow in the system.

4 Claims, 2 Drawing Figures

PROCESS AND APPARATUS FOR SEPARATING SAND FROM BOTANICAL MATERIALS

Matter enclosed in heavy brackets [ ] appears in the original patent but forms no part of this reissue specification; matter printed in italics indicates the additions made by reissue.

BACKGROUND OF THE INVENTION

In the commercial processing of tobacco a large amount of tobacco fines, i.e., very small particles of tobacco are created. Various means have been disclosed for reuse of these tobacco fines as in a reconstituted tobacco sheet.

However, the fines are often found in combination with sand. The tobacco fines cannot be directly processed to a reconstituted sheet because of the sand present and the sand must, therefore, be removed before further processing. Similar problems arise with other botanical materials.

CROSS-REFERENCE TO RELATED APPLICATIONS

This application is related to the subject matter of U.S. Pat. No. 3,608,717 - Strubel et al., assigned to the same assignee as the present invention and to U.S. Pat. application Ser. No. 166,635, filed July 27, 1971.

SUMMARY OF THE INVENTION

In accordance with the present invention, it has unexpectedly been discovered that sand can be separated from botanical materials, particularly tobacco, employing a fluidized bed with a particular type of support. The fluidized bed is of generally standard configuration and employs a flow of a fluid, preferably a gas such as, for example, air through the bottom to maintain the solids over the support level in a fluidized condition. For purposes of the description, air is employed as the fluid medium. It is understood, however, that any fluid may be employed which provides the result desired. While air may be forced through the system by a blower located at the bottom, it has been found preferable to employ vacuum, both for the steady flow and for any superimposed pulsed flow.

The primary difference between a standard fluidized bed and the one according to the present invention is in the support for the fluidized material. The support is formed from a plurality of particles, preferably spherical beads, held between wire screening. The beads are formed of an abrasion resistant material, such as steel. However, other materials, including glass and ceramic beads can be employed. This bed of particles acts as a filter during the separation, preventing too great a flow of the botanical which should be passed upwardly in the system, as opposed to the sand which should filter through the support.

Particularly in smaller units, for maximum botanical recovery, a superimposed air pulsation should be employed. The duration of the pulse, relative to the time between pulses, should be very small. The use of this superimposed pulse aids in reducing the content of sand found in the botanical which is passed upwardly. Similarly, improved results are found with a reduction in the velocity of the steady air flow, feed rate, and residence time within the fluidized bed.

DESCRIPTION OF THE PREFERRED EMBODIMENTS

Figure 1:
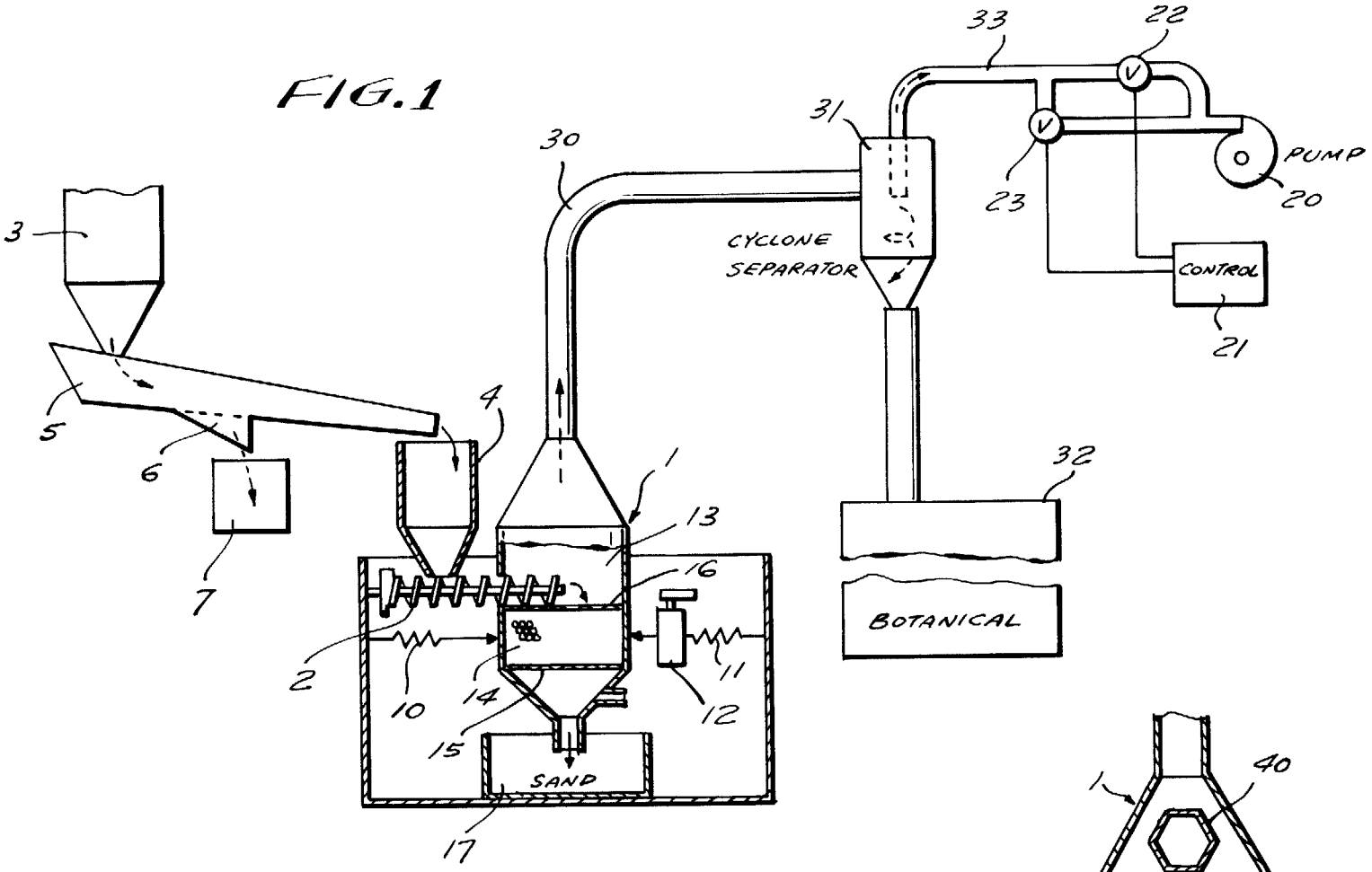
FIG. 1 shows the apparatus to be employed in the present invention.

An apparatus according to the present invention is illustrated in the accompanying figure. A fluidized bed 1 is provided with a mixture of sand and botanical material by screw conveyor 2. This means of transferring the sand and botanical material to be separated is preferred, but an air stream can be employed for the transfer.

The mixture of sand and botanical material is fed to the screw conveyor through a series of hoppers 3 and 4 and a feed chute 5. The feed chute may be vibratory. When a vibratory feed chute is employed, a preliminary separation can be accomplished employing a sieve 6 with the finer particle sand being deposited in receptacle 7. This screw feeder can be attached to the column by a flexible rubber septum having an air-tight seal which allows the column to vibrate without drastically affecting the screw feeder.

The fluidized bed 1 is provided with flexible supports 10 and 11 so as to allow for vibration of the unit to aid in fluidization. Means 12 for creating a vibration are also illustrated. The mixture of sand and botanical material is maintained in a fluidized state in section 13 of the fluidized bed. A support, forming a portion of the subject of the present invention, is provided in area 14 of the bed. The support includes two wire mesh screens 15 and 16 which define the support area 14. Within the support area 14 a plurality of closely packed particles are provided. The particles are preferably spherical, but irregular granules, rings, and saddles can also be employed. Essentially any abrasion resistant material can be used, including steel and glass. Additionally, other materials such as ceramics, thermo-setting resins, etc., can be used. The sand, separated from the botanical material, filters through the bed of particles in section 14 and is collected in receptable 17.

The height of the particle bed on which the mixture of botanicals and tobacco is supported will generally range from about ½ to 1½ inches.

The vibration of the fluidized bed column serves a number of functions. It first vibrates the particles which form the bed to prevent channeling. As a second function, the vibration acts to distribute the tobacco and sand on the top screen. Further, the vibration aids in conveying the sand in the support out of the system. The rate of vibration is from about 120 to 2,400 cycles per minute, preferably about 1,000 to 1,400.

As illustrated, an air flow through the system is created by a vacuum pump 20. Of course, any suitable vacuum source can be employed. There is both a steady flow of air, so as to maintain fluidization and separate the different types of particles, and a pulsed air flow, which aids significantly in the separation. This pulsed air flow is superimposed on the steady, or constant, air flow. A control means 21 actuates valves 22 and 23 so as to maintain the steady flow and, at the desired intervals, superimpose the desired pulsed flow. Because of the air flow through the system, and the particular configuration of the botanical particle, a mixture of the botanical, such as tobacco, and air flows through riser 30 to a cyclone separator 31. Obviously, any type of separator for separation of solid particles from a gas can be employed here. In the cyclone separator, the botanical material is separated from the air and falls into receptacle 32, while the gas continues through riser 33 to the vacuum source.

One factor which allows operation according to the present invention is the difference in settling times between particles of sand and particles of tobacco of equal size, in a moving air stream. For example, with 20 mesh particles, tobacco has a settling velocity of approximately 125 centimeters per second, while the velocity for sand of the same size is approximately 350 centimeters per second. Similarly, with particle sizes of 50 mesh, the values are 80 centimeters per second for tobacco and 200 for sand; at 100 mesh particle size the values are approximately 45 centimeters per second for tobacco and 95 for sand.

The terminal velocity of 30 mesh tobacco is essentially the same as that of 100 mesh sand. For that reason, screening or sieving of the feed to the fluidized bed is preferred so that the maximum content of particles of 100 mesh and below is no more than 2 percent.

As previously indicated, the support for the material in the fluidized bed is formed from two wire screens holding particulate material between them. It is important that the open area remaining between these particles is from 5 to 30 percent of the column diameter. The size of the openings between the particles must be great enough for the larger particles of sand being separated to pass through. For 30 mesh particles, these openings should be at least 0.6 mm.

It is preferred that the particles held between the screens be spherical. When spherical particles are used they should have a diameter of from 2 to 5 mm., preferably about 3 mm. It has also been found that 3-center packing is preferable, but that too strict an adherence to 3-center packing can create operational problems, particularly blocking. To avoid this problem of blocking, it has been found desirable to employ a mixture of particle sizes or a tolerance of $\pm 20$ percent in the sizing of the beads placed in the support. The size of the wires 15 and 16 holding the filtering particles is not critical, but is preferably about 10 mesh. This size is desired to prevent these particles in the support from passing through the screens.

With spheres of the size referred to above, the fine particles of sand will gradually filter through. On the other hand, the botanical material, particularly tobacco, generally does not approach a spherical configuration, as does the sand, and thus has at least one dimension greater than the other two. For this reason, it is much more difficult for the botanical to filter through the support bed and a minimal amount of botanical passes through.

The velocity of air in the static air flow will vary with the size of the unit being operated, higher flow rates being employed with larger units. For example, when the diameter of the fluidized bed vessel 1 is about 3 inches, the static air flow velocity should be between about 1.2 and 41 feet per minute, preferably between 15 and 30 feet per minute. On the other hand, when the diameter of the fluidized bed is approximately 12 inches the air velocity should vary from about 30 to 100 feet per minute, preferably 50 to 75 feet per minute.

With the smaller units, it has been found advantageous to employ a superimposed pulsed flow on the steady air flow. The gas pulsations serve two primary purposes. The superimposed gas flow aids in separation, primarily by accelerating the removal of tobacco from the fluidized bed column. As a further advantage, it aids in cleaning the porous bed support by removing particles of botanicals which may have begun to filter through from the bed, and by returning these particles to the fluidized mixture above the support. When smaller sized fluidized beds are used, as, for example, with the 3 inch bed, the pulsation velocity should be from about 15 to 88 feet per minute, preferably from about 35 to 70 feet per minute. The duration of each pulse should be about 0.5 to 10 seconds and the pulse frequency should be from about one-half to sixty per minute.

As previously indicated, while the air flow could be provided by a pump placed below the support bed, a vacuum source beyond the solid-gas separator is preferable. This preference is based upon practical and economical mechanics, rather than technical considerations. If the air flow is created by a pump below the support bed, then an air lock would be necessary for periodic discharge of the sand separated from the botanical material. Due to the abrasive nature of the sand, the life of the air lock would be relatively short. Employing a vacuum source, such as a pump, in a portion of the system not contacted by solids, or, if contacted by solids, by relatively small amounts of the less abrasive botanical material, this problem is ameliorated.

Figure 2:
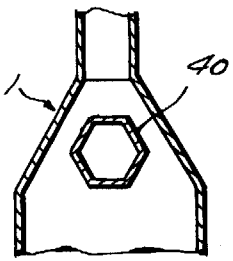
FIG. 2 illustrates a baffle to be placed in the tapered section of the fluidized bed vessel.

With the larger sized fluid bed vessels, for example, those having diameters over about 6 inches, a concentric cone baffle 40, such as illustrated in FIG. 2, is placed within the upwardly tapering portion of the vessel. The baffles serve two purposes. They direct the air flow away from the center of the vessel where the sand content is greatest and they also reduce the amount of material contained in the column at any given time. Particularly with the larger columns, the system would become clogged if the baffles were not present.

Employing the apparatus and process according to the present invention the amount of botanical which can be recovered is approximately 90 percent of that fed to the system. The sand content of this botanical material is less than 5 percent. As such, the material is particularly useful in the formation of a reconstituted tobacco sheet.

In order that those skilled in the art may be better enabled to construct the apparatus and practice the process of the present invention, the following examples are given. These examples should be considered as illustrative and not as limiting in any way the full scope of the invention as covered in the appended claims. All parts in these examples, unless otherwise indicated, are by weight. In each of the examples the mixture of tobacco and sand was screened so that the material fed to the fluidized bed was between 30 and 90 mesh.

EXAMPLE 1

A system constructed according to FIG. 1 and having a 3 inch diameter column was employed. A 2,000 part sample having approximately 50 percent sand was divided into several equal parts. One part was processed at a feed rate of 1 part per second at a pulse velocity of 40 feet per minute and a steady velocity of 14 feet per minute. The pulse duration was 1.5 seconds and the frequency was 24 per minute. The support bed employed beneath the fluidized bed was formed from glass beads having a diameter of 4 millimeters. The system was vibrated at 1,000 cycles per minute. A quantity of 87.9 percent of the original tobacco was recovered and this tobacco had a sand content of 3.9 percent.

The second part of the original sample was processed in the same manner except that a wire screen having 0.5 mm. openings was employed in place of the glass beads. Employing this system, only 72.9 percent of the original tobacco was recovered and this tobacco had a sand content of 10.4 percent.

Similar results were obtained employing botanicals, such as tea, in place of the tobacco.

EXAMPLE 2

The apparatus and process were the same as in Example 1, except that the pulse velocity was 73 feet per minute and the steady velocity was 28 feet per minute. Three different sand-tobacco mixtures were processed in this apparatus with initial and final conditions as indicated in Table 1.

TABLE 1

| Initial Tobacco Type | Initial Sand Content | Per Cent Tobacco Recovered | Per Cent Sand in Recovered Tobacco |
|---|---|---|---|
| Burley | 17 | 89 | 2.6 |
| Flue cured | 41 | 92 | 4.1 |
| Mixed tobacco dust | 13 | 78 | 2.7 |

Thus, as can be seen, the separation is not significantly affected by the type of tobacco processed.

EXAMPLE 3

The apparatus employed in this example was the same as that in Example 1, except that the column diameter was 12 inches and concentric cones were placed in the upper portion of the column, as illustrated in FIG. 2. The column was employed to separate a mixture of burley dust containing approximately 20 percent sand. A pulse velocity of 84 feet per minute was employed superimposed on a steady velocity of 50 feet per minute. The pulse duration was one second and the pulse frequency was 24 per minute. The system was vibrated at 1,200 cycles per minute. A quantity of 80 percent of the tobacco fed to the column was recovered and this tobacco had a sand content of 3.5 percent.

EXAMPLE 4

The same apparatus and material were employed as in Example 3. No superimposed pulse was employed in this example and a constant, steady air flow of 64 feet per minute was used. A quantity of 89 percent of the tobacco fed to the column was recovered and this tobacco had a sand content of 3.3 percent. This illustrates the lack of need for a superimposed pulsation with larger fluid bed columns.

Similar results were obtained employing botanicals, such as tea, in place of the tobacco.

EXAMPLE 5

This example illustrates the efficacy of the concentric cones shown in FIG. 2. The materials and conditions were the same as in Example 4 except that in one case the cones were employed and in another case were removed. After 15 minutes the tobacco being processed without the baffles showed a recovery of 80 percent and a sand content of 3.9 percent. With the baffles, and under the same conditions, 85 percent of the tobacco was recovered with a sand content of 3.6 percent. However, after an additional 15 minutes, the system without the baffles was clogged and inoperative.

The process and apparatus has thus been described for the separation of sand from botanical materials. While particular factors have been illustrated and described, the invention should not be limited except as in the appended claims.

I claim:

1. An apparatus for the dry separation of sand particles from botanical fines in which substantially all of the sand particles and fines have a size which [is less than] *will be retained on* about *a* 100 mesh *screen* comprising a. a substantially enclosed chamber;

b. supports means positioned at the bottom of said chamber for permitting the discharge of sand from said chamber, said support means including a plurality of substantially spherical bodies having a diameter of 2 to 5 mm and a tolerance of ±20 percent and constrained into substantially 3-center close packing;

c. first means for supplying a mixture of sand and botanical fines having a size [less than] *which will be retained on* about *a* 100 mesh *screen* into said chamber above said support means;

d. second means for moving an upwardly flow of gas through said support means into said chamber at a steady velocity sufficient to fluidize the mixture of sand and botanical fines above the support means; and e. vibrating means for vibrating said support means.

2. The apparatus of claim 1 in which a third means superimposes a pulse flow on a steady flow of gas having a velocity of 1.2 to 41 feet per minute.

3. The apparatus of claim 2 in which said third means superimposes the pulse flow at a velocity of 15 to 88 feet per minute for a pulse duration of 0.5 to 10 seconds and at a pulse frequency of one-half to sixty per minute.

4. The apparatus of claim 1 having a baffle means positioned within the chamber and adjacent the center of said support means for directing the air flow away from the center of said column.

* * * * *